United States Patent
Jensen

(10) Patent No.: US 9,224,197 B2
(45) Date of Patent: Dec. 29, 2015

(54) METHOD AND APPARATUS FOR IMPLEMENTING OPTICAL ROLL SCANNING TO IDENTIFY DEFECTS IN ROLL COMPONENTS USED IN AN IMAGE PRODUCTION DEVICE

(71) Applicant: XEROX Corporation, Norwalk, CT (US)

(72) Inventor: Christopher Jensen, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 123 days.

(21) Appl. No.: 14/077,350

(22) Filed: Nov. 12, 2013

(65) Prior Publication Data

US 2015/0131895 A1    May 14, 2015

(51) Int. Cl.
*G06K 9/00* (2006.01)
*G06T 7/00* (2006.01)

(52) U.S. Cl.
CPC ..... *G06T 7/0004* (2013.01); *G06T 2207/20056* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 5,428,452 A * | 6/1995 | Grycewicz | 356/430 |
| 7,117,047 B1 * | 10/2006 | Blake et al. | 700/56 |
| 2004/0022430 A1 * | 2/2004 | Franssen et al. | 382/152 |
| 2005/0265739 A1 * | 12/2005 | Hamby et al. | 399/49 |
| 2007/0122185 A1 * | 5/2007 | Yamazaki et al. | 399/109 |
| 2008/0063426 A1 * | 3/2008 | Chang et al. | 399/98 |
| 2008/0231269 A1 * | 9/2008 | Ookawa | 324/307 |
| 2010/0027872 A1 * | 2/2010 | Daito et al. | 382/141 |

* cited by examiner

*Primary Examiner* — Hadi Akhavannik
(74) *Attorney, Agent, or Firm* — Ronald E. Prass, Jr.; Prass LLP

(57) ABSTRACT

A system and method are provided for employing a unique optical roll scanning technique, scheme or process for detecting and identifying periodic surface defects associated with rolls usable in image production devices. An apparatus is provided for mounting the roll to implement an inspection technique that facilitates forming an image of a surface of the roll by rotating the roll through an entire cycle above a full width scanner device. The formed image of the surface of the scanned roll is filtered and analyzed particularly by applying a Fourier analysis technique, and/or by subjecting the filtered image data to a series of fast Fourier transforms (FFTs), potentially including 2D FFTs. The analysis process allows detected periodic defects in the formed image of the surface of the roll under analysis to be characterized by a magnitude of a response in a spatial frequency domain.

14 Claims, 5 Drawing Sheets

METHOD AND APPARATUS FOR IMPLEMENTING OPTICAL ROLL SCANNING TO IDENTIFY DEFECTS IN ROLL COMPONENTS USED IN AN IMAGE PRODUCTION DEVICE

BACKGROUND

1. Field of Disclosed Subject Matter

This disclosure relates to systems and methods for employing a unique optical roll scanning technique to identify surface defects, and particularly repetitive surface defects, for rolls usable in image production devices.

2. Related Art

Currently, certain roll components employed by image forming devices, including and particularly fuser rolls, experience defects related to, and potentially introduced by, among other things, flow coating processes by which the surfaces of the rolls are formed for use in image forming devices. Commonly, the introduced defects, manifested as repetitive defects of a frequency related to the finishing process, are referred to, among other things, as "barber pole" defects. The barber pole effect manifests itself often by appearing as stripes on the rolls, including the fuser rolls. The stripes are often presented at a same frequency as a pitch of the flow coating process by which the surface coatings of the affected rolls were formed. The presence of these stripes results in a reduction in image quality for images formed, fixed or otherwise processed on image receiving media substrates through contact with the barber poled rolls. These defects are often most discernible as they are printed out as gloss defects on dark solids.

The particular nature of the defect, while clearly discernible, and the root cause of the defect, have proven, over time difficult to isolate and, therefore, to specifically address in, for example, some modification of the finishing and/or flow coating process. As a result, a limitedly effective technique for determining whether a batch of finished rolls is acceptable for sale or other release for field use has been developed that involves selecting random samples from individual batches of finished rolls. These random samples are then tested to determine whether a level of any barber poling that exists is below an established threshold that represents an acceptable level for the entire batch of finished rolls. Metrics (established thresholds) for acceptable levels of barber poling on prints have been developed and are applied to the sampling process.

Those of skill in the art recognize that certain shortfalls exist in the above-described sampling methods of testing leading to approval of entire batches of finished rolls. Any batch, it is recognized, may include individual rolls that may include levels of barber poling that lie outside a range of what may be considered to be acceptable, which may be detected in the sampling process leading to customer dissatisfaction when employing those errant rolls. Currently, there is no effective method for direct roll measurement of defect levels, including barber pole levels, on each roll prior to release for use. All attempts to address these shortfalls to date, including the use of such techniques as laser and perth trace measurements, have failed to produce acceptable results even and to any extent that they could even have been effectively and/or reasonably implemented.

The state of the art, therefore, remains a technique in which only samples from each batch of produced rolls are print tested. If the prints from the samples of the rolls from each batch are below developed specification limits for barber pole defects or effects on produced prints, the entire batch is then deemed acceptable and released for sale or other field use.

FIG. 1 illustrates a flowchart of the conventional, and generally currently-undertaken, process for sample roll testing and verification prior to release of a batch of rolls, from which the samples were selected, for use. As shown in FIG. 1, the conventional process commences at Step S1000 and proceeds to Step S1100.

In Step S1100, a batch of surface prepared rolls is completed. Operation of the conventional process proceeds to Step S1200.

In Step S1200, samples are selected at random from the batch of surface prepared (finished) rolls and the samples are sent for testing. Operation of the conventional process proceeds to Step S1300.

In Step S1300, machine time is scheduled for undertaking the samples testing. Operation of the conventional process proceeds to Step S1400.

In Step S1400, the selected sample rolls, and potentially a plurality of control rolls, are print tested. Operation of the conventional process proceeds to Step S1500.

In Step S1500, prints developed in the print testing step are sent to, and scanned by, a group that may analyze test patterns, such as an Image Quality Media Lab (IQML). Operation of the conventional process proceeds to Step S1600.

In Step S1600, quality control engineering personnel interpret the print scans and communicate the results of their interpretation (analysis) to manufacturing and distribution personnel. Operation of the conventional process proceeds to Step S1700.

In Step S1700, only after successful testing of the samples selected from the finished batch of rolls is complete is the finished batch of rolls released for sale and/or for other field use by the manufacturing or distribution personnel. Operation of the conventional process proceeds to Step S1800, where operation of the conventional process ceases.

The above-described conventional process is an expensive and time-consuming process. Machine time is expensive and adds the risk of machine variation to the analytic process. The time and expense of print testing rolls has limited the amount of testing aimed at understanding the root cause of, and critical parameters that drive, the barber pole effect/defect. Additionally, the sample-focused process may not be effective in detecting all incidents of barber poling defects in a particular batch of finished rolls, leading to potential customer dissatisfaction based on the effect on image quality produced by an out-of-specification finished roll that is not detected by the conventional sampling process.

SUMMARY

In view of the above shortfalls in the time-consuming and expensive conventional processes for limitedly identifying defects in rolls, and particularly on fuser roll surfaces, it would be advantageous to develop a straightforward and repeatable system and/or method by which to more easily scan and identify surface defects in individual rolls used in image production and image forming devices.

Exemplary embodiments of the disclosed systems and methods may implement a process by which to more easily identify surface defects in each individual roll in a batch of finished rolls.

Exemplary embodiments may provide an apparatus for mounting the roll to implement an inspection technique that facilitates forming an image of a surface of the roll by rotating the roll through an entire cycle above a full width (spanwise) scanner device or scanner head.

In embodiments, the formed image of the surface of the scanned roll may then be filtered and analyzed particularly by applying a Fourier transform analysis technique, and/or by subjecting the filtered image data to a series of fast Fourier transforms (FFTs). Such an analysis process may allow detected periodic defects in the formed image of the surface of the roll under analysis to be characterized by a magnitude of a response in a spatial frequency domain.

In embodiments, the FFT image analysis for print defects may be uniquely applied to analyze potential banding defects on generated prints. An application of the FFT analysis to a roll surface in this context is understood to be unique by those of skill in the art.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for employing a unique optical roll scanning to identify surface defects associated with finished surfaces of rolls usable in image production devices, will be described, in detail, with reference to the following drawings, in which.

DETAILED DESCRIPTION

The disclosed systems and methods for employing a unique optical roll scanning technique to identify surface defects in rolls usable in image production devices according to this disclosure will generally refer to this specific utility or function for those systems and methods. Exemplary embodiments described and depicted in this disclosure should not be interpreted as being specifically limited to any particular configuration of the described elements. Further, exemplary embodiments described and depicted in this disclosure should not be interpreted as being specifically directed to any particular intended use, including any particular functioning or operation of a particular image forming device within which the described rolls, which may be scanned and analyzed according to this disclosure, may be employed.

Specific reference to, for example, various configurations of image forming systems and component devices within those systems, including fusing system rolls and/or components, as those concepts and related terms are captured and used throughout this disclosure, should not be considered as limiting those concepts or terms to any particular configuration of the respective devices, system configurations or individual elements. The subject matter of this disclosure is intended to broadly encompass analysis of roll elements that are employed in systems and/or devices, and with schemes, that may involve image forming and finishing operations, as those operations would be familiar to those of skill in the art.

The disclosed embodiments may specifically address shortfalls in conventional processes, techniques and/or methods for evaluating surface conditions of differing types of roll components for use in image forming devices that are conventionally finished with a flow coating surfacing process. For the reasons discussed above, earlier methods for evaluating image quality defects introduced by flaws in a surface coat of rolls used in image forming devices were of limited effectiveness for stated reasons, including being expensive and time consuming while only testing a random subset of all of the individual rolls in a batch. The disclosed systems and methods are directed at, among other objectives, addressing these issues.

Figure 1:
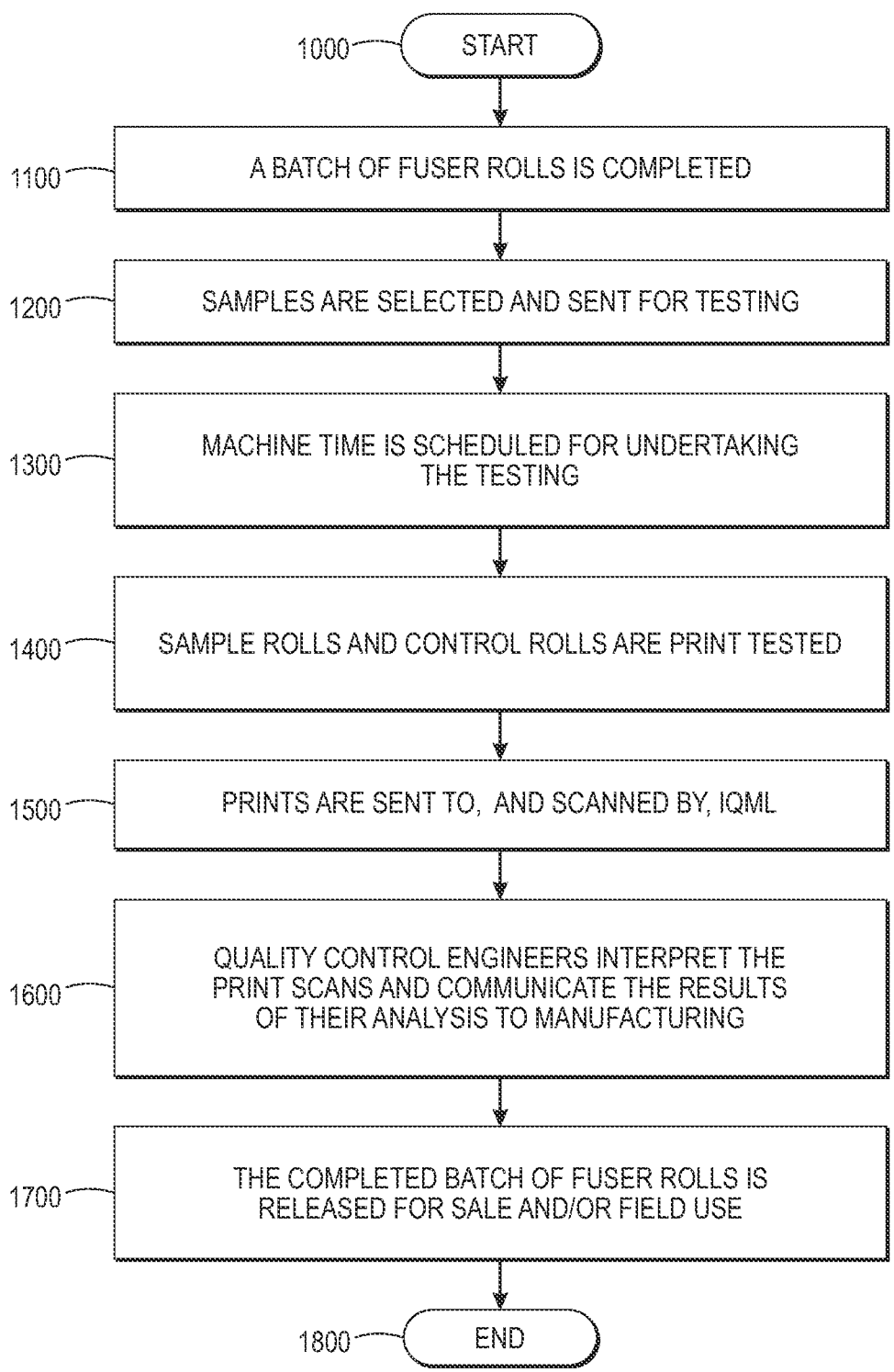
FIG. 1 illustrates a flowchart of the currently-undertaken process for sample testing and verification prior to release of a batch of rolls for use.
Figure 2:
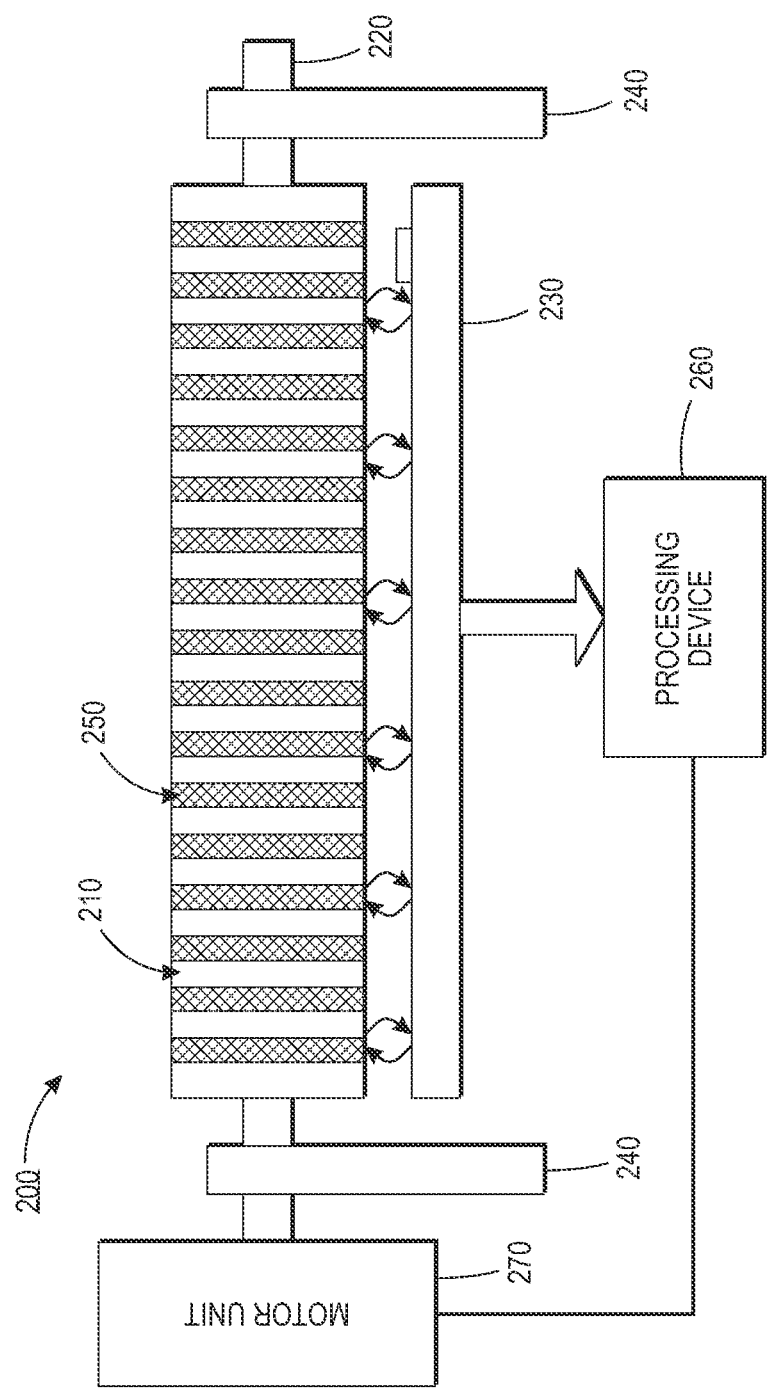
FIG. 2 illustrates a schematic diagram of an exemplary roll scanning environment or apparatus for scanning a mounted roll for use in an image production device to identify defects in the surface of the mounted roll according to this disclosure.

FIG. 2 illustrates a schematic diagram of an exemplary roller scanning environment or apparatus 200 for scanning a mounted roll 210 for use in an image production device to identify defects in a surface 250 of the mounted roll 210 according to this disclosure. As is shown in FIG. 2, the mounted roll 210 with potential periodic defects in the surface 250 of the mounted roll 210 may be loaded in an apparatus 240 that holds the mounted roll 210 via an axis component 220 above a scanner bar 230. A motor unit 270 may rotate the mounted roll 210 at a known speed while a frame grabber, or other imaging, process in a processing device 260 may communicate with the scanner bar 230 to receive image data from the scanner bar 230 (see the multiple arrows in FIG. 2). With one full revolution of the mounted roll 210 with the motor unit 270, an image of the entire roll surface 250 can be formulated in the processing device 260. The produced image may then be analyzed in the processing device 260 with the application of a particular processing and/or analyzing algorithm, including and preferably a processing and/or analyzing algorithm that involves fast Fourier transform components and filters for periodic responses.

In experimentation, a prototype apparatus (fixture) was employed to successfully image a fuser roll. Due to the specular nature of the barber pole effect, the scanner bar angle was adjusted and optimized to maximize specular response. The images experimentally collected by the scanner bar in the prototype fixture were then analyzed with a 2D FFT, and the results were plotted along an axis of interest. See FIG. 5. In the experimental results plot 500 shown in FIG. 5, a wavelength of a spike 520 in FFT intensity in the plotted results 510 was determined to substantially match with a known pitch of the flow coating process and the wavelengths from prints on the fuser rolls subjected to the experimental analysis.

In short, the disclosed systems and methods may involve unique inspection and analysis concepts using a scanner bar, device or array to directly analyze a roll/drum for periodic surface defects. An advantage is that implementation of the disclosed systems and methods provides a technique to comparatively quickly and easily analyze surface defects on each roll in a batch rather than being limited by time and expense to reasonably only analyzing a sampling of the finished batch of rolls and extrapolating that analysis to the entire finished batch of rolls. For example, the disclosed schemes are much faster than conventional processes in that individual rolls can be analyzed in less than one minute instead of in a week plus, taking into account all of the logistics incumbent in the conventional process. The disclosed schemes may significantly reduce, and in cases may eliminate, the need to resort to one or more of expensive machine, engineer and/or technician time. Accuracy may be improved as noise introduced by machine dependent image formation in the conventional print testing process may be effectively removed as a variable in the imaging and analysis techniques. By directly measuring the finished roll surface, a significant amount of measurement noise could be reduced.

Figure 3:
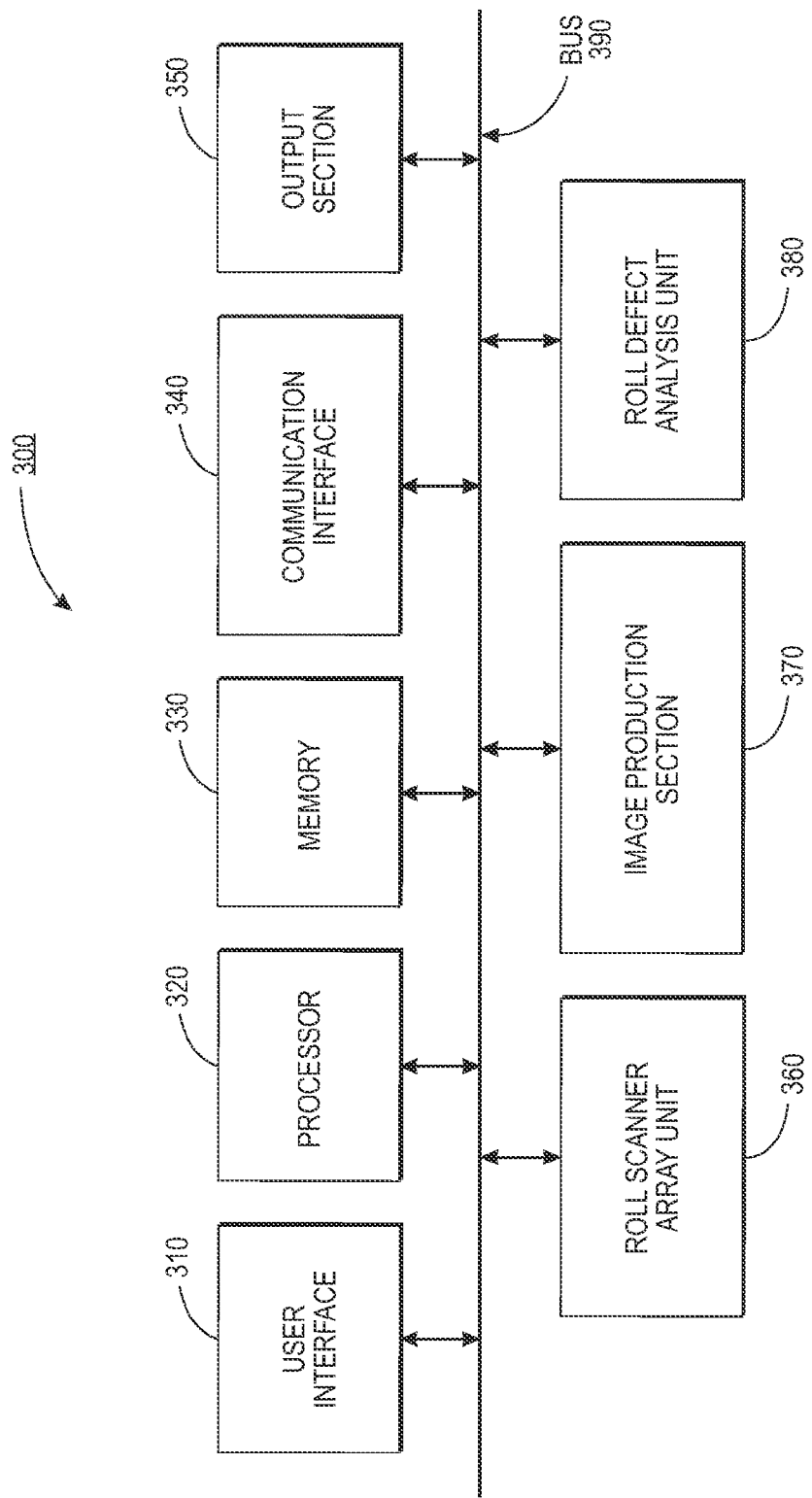
FIG. 3 illustrates a block diagram of an exemplary analysis and processing system that is usable in identifying surface defects in rolls used in image production devices according to this disclosure.

FIG. 3 illustrates a block diagram of an exemplary analysis and processing system (device) 300 that is usable to identify surface defects in rolls used in image production and image forming devices according to this disclosure. The components of the exemplary analysis and processing system 300 shown in FIG. 3 may be embodied in a single location or may be distributed remotely. Data storage and analysis elements depicted as being portions of the exemplary analysis and processing system 300 shown in FIG. 3 may be housed integrally with the other elements of the depicted exemplary analysis and processing system 300, or may be hosted separately, including, for example, in the cloud.

The exemplary analysis and processing system 300 may include a user interface 310 by which a user, including technical personnel or administrator personnel, may communicate with the exemplary analysis and processing system 300. The user interface 310 may be configured as one or more conventional mechanisms common to typical computing devices and user workstations. The user interface 310 may permit the user to input information to the exemplary analysis and processing system 300 in order to facilitate the analysis and processing functions for detecting, or otherwise identifying, surface defects in individual rolls for use in image forming devices when mounted for scanning in an apparatus that facilitates such detection and identification. See FIG. 2. The user interface 310 may be employed in conjunction with a data output/display device, including an output section 350, described in more detail below, for a user to interact with displayed menu options that may be provided to the user for implementing the scanning and analysis process. Any commonly-known methods by which to select or input information via a user interface 310 may be employed, including, but not limited to, drop-down menus and the like.

The exemplary analysis and processing system 300 may include one or more local processors 320 for individually operating the exemplary analysis and processing system 300 and for carrying out control of the scanning, processing and analysis functions, schemes and techniques outlined in this disclosure. Processor(s) 320 may include at least one conventional processor or microprocessor that interprets and executes instructions to direct specific applications and functions with regard to controlling a scanning process. The processor(s) 320 may analyze a formed image of the surface of a scanned roll by filtering and particularly applying a Fourier analysis technique, and/or by subjecting the filtered image data to a series of FFTs. The processor(s) 320 may allow detected periodic defects in the formed image of the surface of the roll under analysis to then be characterized by a magnitude of a response in a spatial frequency domain. The FFT image analysis for print defects may be uniquely applied to analyze potential banding defects on prints. The processor(s) 320 may identify defects, and illustrate that identification of the defects graphically or otherwise via the output section 350 for use by the user.

The exemplary analysis and processing system 300 may include one or more data storage devices, or memories 330. Such memories 330 may be used to store data or operating programs to be used by the exemplary analysis and processing system 300, and specifically the processor(s) 320. Memories 330 may be used to store information regarding scanned surface images of rolls for use by the processors 320 in applying appropriate algorithms or analysis techniques, as discussed above. Memories 330 may include a random access memory (RAM) or another type of dynamic storage device that is capable of storing collected information, and separately storing instructions for execution of system operations by, for example, processor(s) 320. Memories 330 may also include a read-only memory (ROM), which may include a conventional ROM device or another type of static storage device that stores static information and instructions for processor(s) 320. Further, the memories 330 may be integral to the exemplary analysis and processing system 300, or may be provided external to, and in wired or wireless communication with, the exemplary analysis and processing system 300, including being hosted in the cloud.

The exemplary analysis and processing system 300 may include one or more external data communication interfaces 340 by which the exemplary analysis and processing system 300 may communicate with components external to the exemplary analysis and processing system 300 as may be appropriate to facilitate the identification, analysis, and reporting of detected defects using the exemplary analysis and processing system 300. The one or more external data communication interfaces 340 may be specifically configured, as appropriate, to communicate with individual external components.

The exemplary analysis and processing system 300 may include at least one data output/display device or output section 350, which may be configured as one or more conventional mechanisms, such as a display screen or a printer device, that output information regarding results of an analysis to a user, for example, regarding a graphical illustration (see, e.g., FIG. 5) of a detected defect indicator for repetitive defects in a surface of a roll under analysis by the exemplary analysis and processing system 300.

The exemplary analysis and processing system 300 may include a roll scanner array unit 360 that spanwise linearly scans a circumferential surface of a roll under analysis in an apparatus such as that shown in FIG. 2 to provide the requisite inputs to an image production section 370, which may be used to formulate, format and filter an image of the scanned surface of the roll under analysis.

The exemplary analysis and processing system 300 may include a roll defect analysis unit 380, as a function of the processor 320 or as a standalone unit, that may be used to apply the analysis algorithm(s) described above to the formulated, formatted and filtered image prepared by the image production section 370 in order to provide to the user, via, for example, the output section 350, information on surface defects detected in rolls under analysis.

All of the various components of the exemplary analysis and processing system 300, as depicted in FIG. 3, may be connected by one or more data/control busses 390. These data/control busses 390 may provide wired or wireless communication between the various components of the exemplary analysis and processing system 300, whether all of those components are housed integrally together as a single unit, or are otherwise external and connected to a single integral unit as part of the exemplary analysis and processing system 300. It should be appreciated that, although depicted in FIG. 3 as an integral unit, the various disclosed elements of the exemplary analysis and processing system 300 may be arranged in any combination of sub-systems as individual components or combinations of components, integral to a single unit, or external to, and in wired or wireless communication with, the single unit of the exemplary analysis and processing system 300. In other words, no specific configuration as an integral unit or as a support unit is to be implied by the depiction in FIG. 3. Further, although depicted as individual units for ease of understanding of the details provided in this disclosure regarding the exemplary analysis and processing system 300, it should be understood that the described functions of any of the individually-depicted components may be undertaken, for example, by one or more processors 320 connected to, and in communication with, one or more memories 330.

Figure 4:
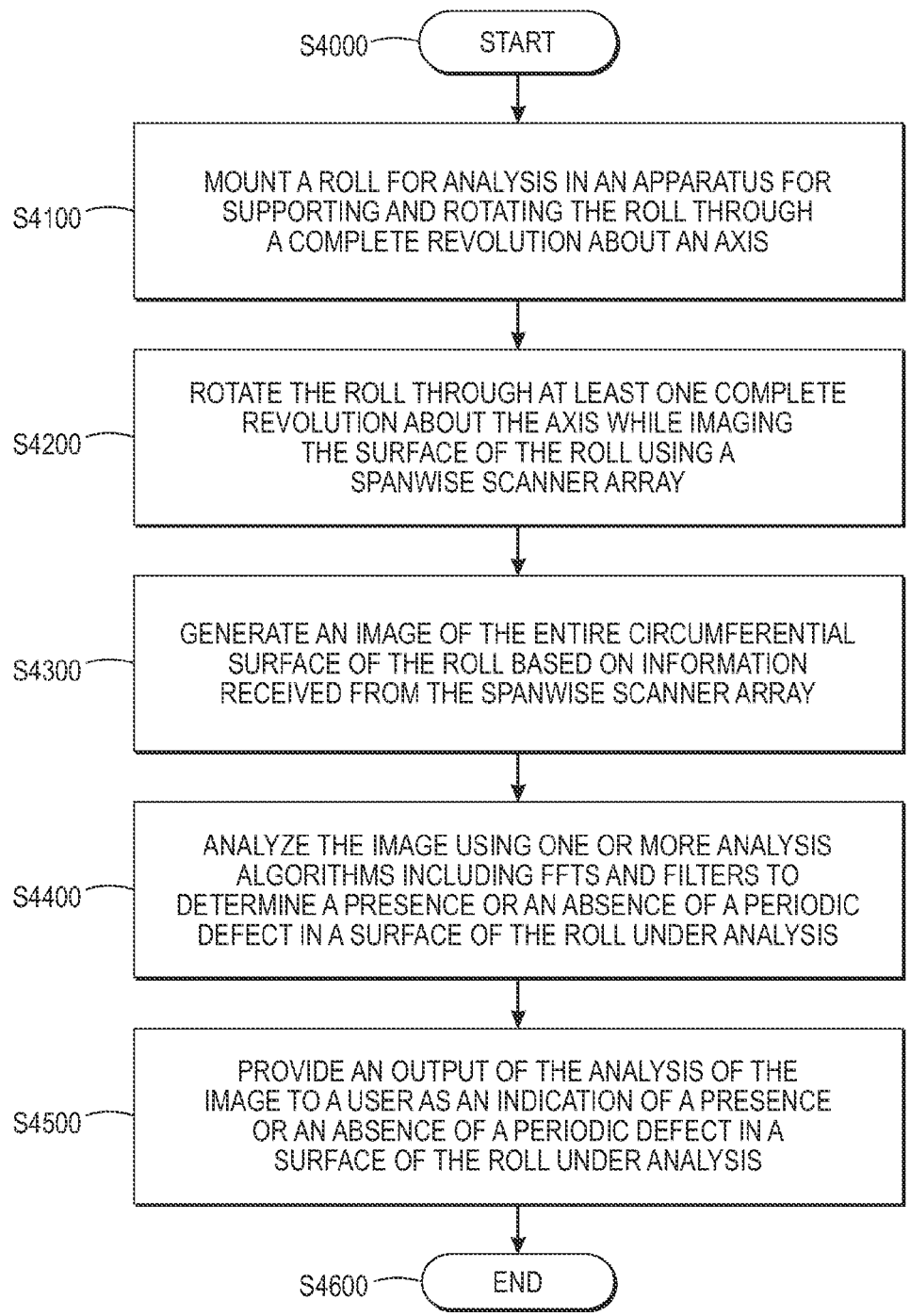
FIG. 4 is a flowchart of an exemplary method for identifying surface defects in rolls used in image production devices according to this disclosure.

The disclosed embodiments may include a method for identifying surface defects in rolls used in image production devices. FIG. 4 illustrates a flowchart of such an exemplary method. As shown in FIG. 4, operation of the method commences at Step S4000 and proceeds to Step S4100.

In Step S4100, a roll with a finished surface may be mounted in an apparatus that supports the roll about an axis and above a spanwise scanner array to facilitate rotation of the roll about the axis by, for example, a motor that may be controlled by a processor implementing a scanning and analysis technique, routine, scheme or function for identifying a presence or absence of periodic surface defects in the finished surface of the roll. Operation of the method proceeds to Step S4200.

In Step S4200, the roll may be rotated under control of the motor through at least one complete revolution about the axis while the surface of the roll is imaged by a spanwise scanner array. Due to the specular nature of a particular surface defect that the spanwise scanner array is intended to image in a manner that the method may analyze, a bar angle for the spanwise scanner array (bar) may be adjusted to maximize a specular response. Operation of the method proceeds to Step S4300.

In Step S4300, an image of the surface of the roll may be generated representing an entire circumferential surface of the roll under analysis based on information received from the spanwise scanner array. The spanwise scanner array may uniquely employ a commercially available, or COTS, drum scanner. A print may be mounted to the drum and rotated above the spanwise scanner array for generating particularly accurate images. Operation of the method proceeds to Step S4400.

In Step S4400, the image may be analyzed using one or more analysis algorithms to determine a presence or an absence of a periodic defect in a finished surface of the roll under analysis. The one or more analysis algorithms may preferably include filtering and analysis, particularly by subjecting the filtered image data to a series of FFTs. Such an analysis process may allow detected periodic defects in the image of the surface of the roll under analysis to be characterized by a magnitude of a response in a spatial frequency domain. The FFT image analysis for print defects may be uniquely applied to analyze potential banding defects on the images. Operation of the method proceeds to Step S4500.

Figure 5:
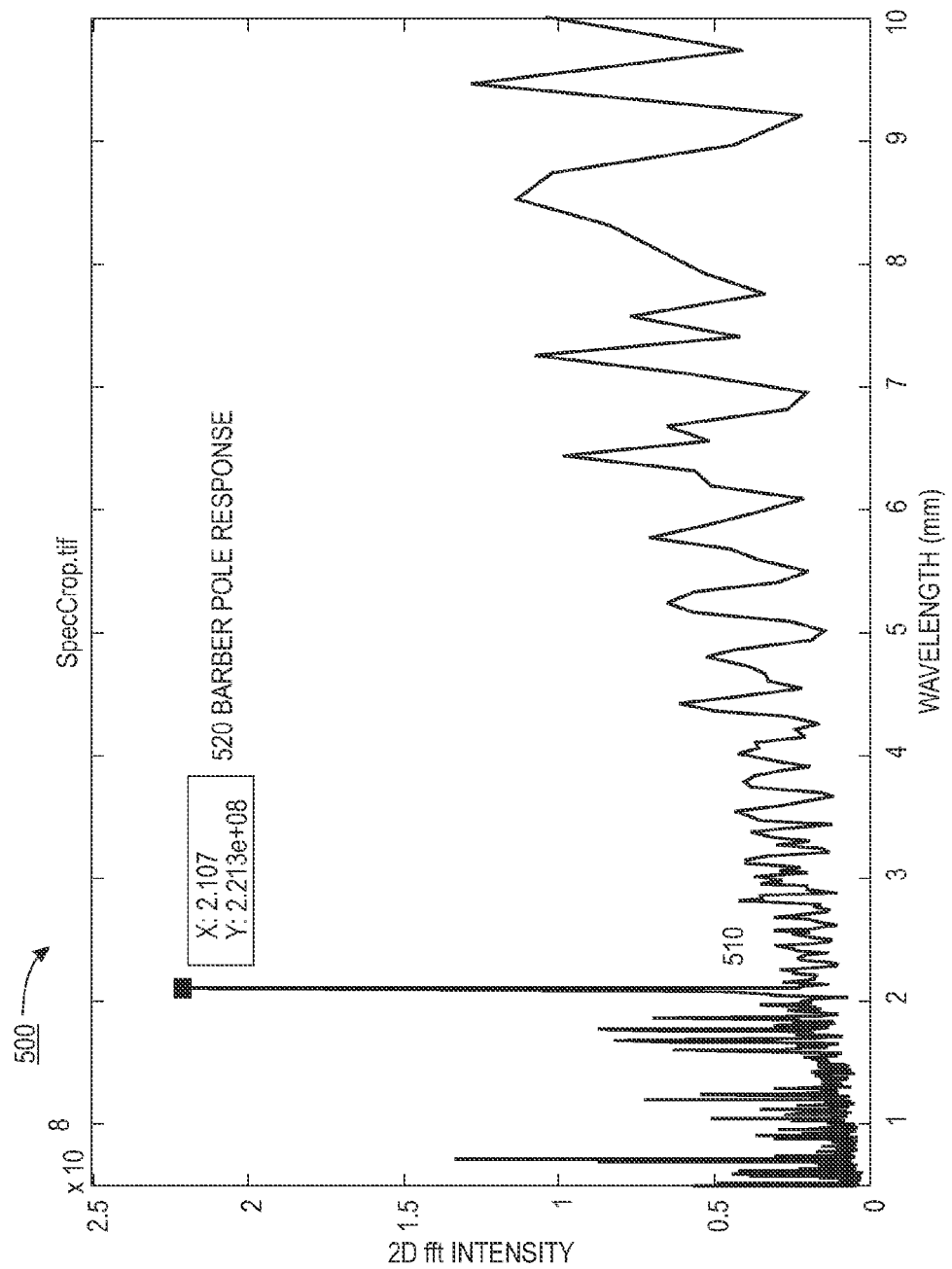
FIG. 5 shows a graph illustrating exemplary results of an experimental roll surface defect identifying analysis for identifying surface defects in rolls used in an image production device according to this disclosure.

In Step S4500, an output of the analysis of the image may be provided to a user, for example in a format as shown in FIG. 5, as an indication of a presence or an absence of the periodic defect in the surface of the roll under analysis. Operation of the method proceeds to Step S4600, where operation of the method ceases.

The above-described exemplary systems and methods reference certain conventional components to provide a brief, general description of suitable imaging, processing and analysis means by which to carry out the disclosed imaging and analysis techniques in support of defect detection and identification in the surfaces of finished rolls for use in image forming devices. Those skilled in the art will appreciate that other embodiments of the disclosed subject matter may be practiced with many types and configurations of individual devices and combinations of devices particularly common the disclosed imaging, processing and analysis techniques. No particular limitation to the variety or configuration of individual component devices, as disclosed, is to be inferred from the above description.

The exemplary depicted sequence of executable instructions represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 4, and the accompanying description, except where a particular method step is a necessary pre-condition to execution of any other method step. Individual method steps may be carried out in sequence or in parallel in simultaneous or near simultaneous timing, as appropriate.

Although the above description may contain specific details, they should not be construed as limiting the claims in any way. Other configurations of the described embodiments of the disclosed systems and methods are part of the scope of this disclosure.

It will be appreciated that a variety of the above-disclosed and other features and functions, or alternatives thereof, may be desirably combined into many other different systems or applications. Various alternatives, modifications, variations, or improvements therein may be subsequently made by those skilled in the art, which are also intended to be encompassed by the following claims.

What is claimed is:

1. A method for identifying defects in a surface of a roll component, comprising:
    mounting a roll component in an apparatus to facilitate rotating the roll component about a lengthwise axis of the roll component with respect to a spanwise scanner array extending along an entirety of the lengthwise axis of the roll component;
    adjusting an angle between the lengthwise axis of the roll component and the spanwise scanner array to maximize a specular response in the spanwise scanner array in an imaging operation;
    executing the imaging operation by scanning a surface of the roll component with the spanwise scanner array through a single complete rotation of the roll component with respect to the spanwise scanner array;
    developing, with a processor, an overall image of the surface of the roll component;
    applying, with the processor, an analysis algorithm to analyze the image of the surface of the roll component to detect a presence of a periodic surface defect in the image of the surface roll component; and
    outputting an indication of the presence of the periodic surface defect on the surface of the roll component based on the analysis of the image.

2. The method of claim 1, the roll component being rotated about the lengthwise axis of the roll component with a motor unit.

3. The method of claim 1, the analysis algorithm including application of a Fourier transform.

4. The method of claim 3, the application of the Fourier transform involving applying a two-dimensional fast Fourier transform.

5. The method of claim 4, the presence of the periodic surface defect in the image of the surface of the roll component being detected by a spike in a graphical depiction of the analysis.

6. A system for identifying defects in a surface of a roll component, comprising:

a spanwise scanner array that scans a surface of a roll component under analysis;

a mounting apparatus for (1) mounting the roll component to facilitate rotating the roll component about a lengthwise axis of the roll component with respect to the spanwise scanner array that extends along an entirety of the lengthwise axis of the roll component, and (2) adjusting an angle between the lengthwise axis of the roll component and the spanwise scanner array to maximize a specular response in the spanwise scanner array in an imaging operation;

a processor that is programmed to
- develop an overall image of the surface of the roll component; and
- apply an analysis algorithm to analyze the image of the surface of the roll component under analysis to detect a presence of a periodic surface defect in the image of the surface roll component; and an output component that outputs an indication of the presence of the periodic surface defect on the surface of the roll component based on the analysis of the image.

7. The system of claim 6, further comprising a motor unit that rotates the roll component about the lengthwise axis of the roll component as mounted in the mounting apparatus.

8. The system of claim 6, the processor applying the analysis algorithm by including application of a Fourier transform.

9. The system of claim 8, the application of the Fourier transform involving applying a two-dimensional fast Fourier transform.

10. The system of claim 9, the presence of the periodic surface defect in the image of the surface of the roll component being detected by a spike in a graphical depiction of the analysis.

11. A non-transitory computer readable medium on which is stored a program that, when executed by a processor, causes the processor to execute a method for identifying defects in a surface of a roll component, the method comprising:

mounting a roll component in an apparatus to facilitate rotating the roll component about a lengthwise axis of the roll component with respect to a spanwise scanner array extending along an entirety of the lengthwise axis of the roll component;

adjusting an angle between the lengthwise axis of the roll component and the spanwise scanner array to maximize a specular response in the spanwise scanner array in an imaging operation;

executing the imaging operation by scanning a surface of the roll component with a scanner array through a single complete rotation of the roll component with respect to the spanwise scanner array;

developing an overall image of the surface of the roll component;

applying an analysis algorithm to analyze the image of the surface of the roll component to detect a presence of a periodic surface defect in the image of the surface roll component; and outputting an indication of the presence of the periodic surface defect on the surface of the roll component based on the analysis of the image.

12. The non-transitory computer readable medium of claim 11, the roll component being rotated about the lengthwise axis of the roll component with a motor unit.

13. The non-transitory computer readable medium of claim 11, the analysis algorithm including application of a two-dimensional fast Fourier transform.

14. The non-transitory computer readable medium of claim 13, the presence of the periodic surface defect in the image of the surface of the roll component being detected by a spike in a graphical depiction of the analysis.

\* \* \* \* \*